United States Patent [15] 3,673,491
Baycura [45] June 27, 1972

[54] MAGNETIC SQUARE WAVE VOLTAGE GENERATOR

[72] Inventor: Orestes M. Baycura, 2238 Central Park Drive, Campbell, Calif. 95008

[22] Filed: Dec. 21, 1970

[21] Appl. No.: 99,872

[52] U.S. Cl. ....................323/48, 307/106, 323/57, 336/155, 336/165
[51] Int. Cl. ....................H01f 35/00, H01f 29/00
[58] Field of Search ....................328/33; 336/155, 160, 165, 336/182; 323/48, 49, 57, 60, 61; 307/106

[56] References Cited

UNITED STATES PATENTS 2,944,208 7/1960 Quimby ....................323/48
3,286,159 11/1966 Kuba ....................323/60 X
3,521,152 7/1970 Emerson ....................323/60
2,973,470 2/1961 Kohn ....................323/60

*Primary Examiner*—Gerald Goldberg
*Attorney*—R. S. Sciascia and Charles D. B. Curry

[57] ABSTRACT

A magnetic square wave voltage generator comprising at least one core having both a high impedance flux path and a low impedance flux path. An input winding couples each of the high and low impedance flux paths and one output winding couples the high impedance flux path and another output winding couples the low impedance flux path. The two output windings are series connected and when a sinusoidal signal is applied to the input winging it results in a square wave output signal across both series connected output windings.

3 Claims, 9 Drawing Figures

Figure 1:
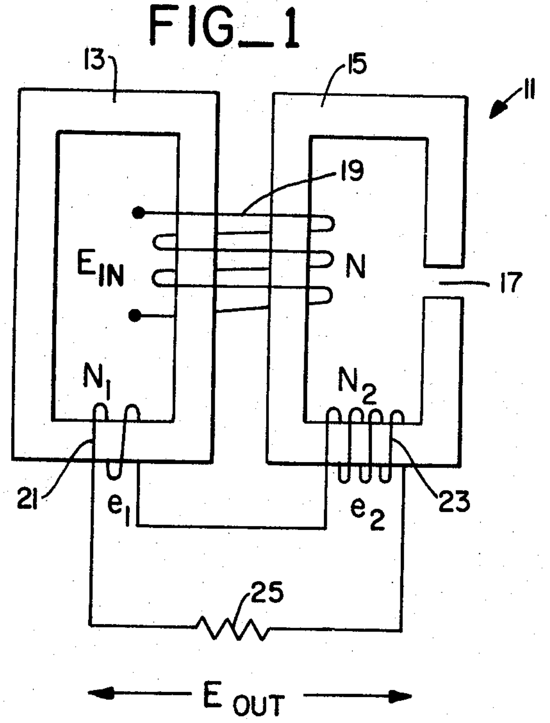

INVENTOR.
ORESTES M. BAYCURA
BY Charles B Curry
ATTORNEY

INVENTOR.
ORESTES M. BAYCURA
BY Charles E. G. Carey
ATTORNEY

MAGNETIC SQUARE WAVE VOLTAGE GENERATOR

The invention described herein may be manufactured and used by or for the Government of the United States of America for governmental purposes without the payment of any royalties thereon or therefor.

The present invention relates to a square wave voltage generator and more particularly to a square wave voltage generator employing all magnetic materials.

In the field of electronic circuitry and particularly in the field of magnetic devices it is of considerable advantage to produce a square wave rather than a sine wave when it is necessary to subsequently filter or store the signal. This is because it requires less expensive and complex circuitry to obtain a dc level of the incoming signal in a square wave rather than a sine wave. There are two commonly used techniques for converting sinusoidal voltages into square shaped voltages with magnetic devices. One of these utilizes the ferroresonant action of a saturable transformer with a capacitor to produce nearly square shaped voltages from sinusoidal inputs. Another technique uses a saw-tooth input current in combination with rather complex magnetic circuitry. The disadvantage of the first technique is that it requires a capacitor which usually limits the reliability of the device whereas the other technique requires complex circuitry.

The present invention overcomes these difficulties by providing a relatively simple magnetic device that employs a sinusoidal input signal, no capacitors or active devices, and produces a square shaped output voltage signal.

Accordingly, an object of the present invention is to provide a relatively simple and reliable all magnetic device that produces square shaped alternating voltages from a sinusoidal signal.

Briefly, the present invention comprises a magnetic square wave voltage generator comprising at least one core having both a high impedance flux path and a low impedance flux path. An input winding couples each of the high and low impedance flux paths and one output winding couples the high impedance flux path and another output winding couples the low impedance flux path. The two output windings are series connected and when a sinusoidal signal is applied to the input winding it results in a square wave output signal across both series connected output windings. In the preferred embodiment the input winding has about 120 turns, the high impedance output winding about 80 turns and the low impedance output winding about 150 turns. In one embodiment there are two separate cores wherein a continuous core comprises the high impedance flux path and a separate core having an air gap comprises the low impedance flux path. In another embodiment the high and low impedance flux paths are formed in a single core. In still another embodiment the magnetic square wave square wave generator comprises a single core having two low impedance flux paths and two high impedance flux paths.

Figure 3:
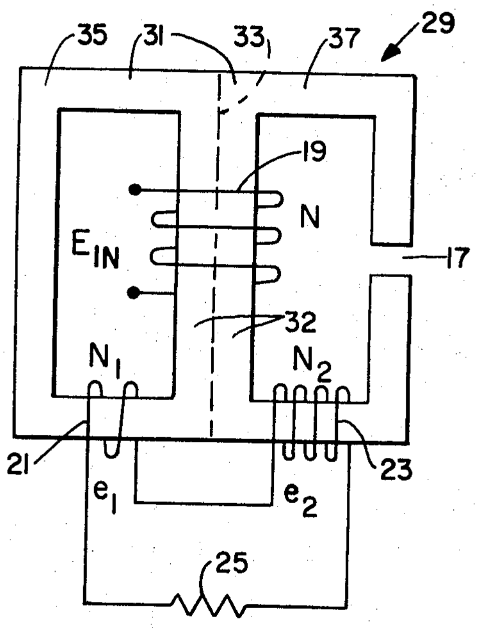
Figure 4:
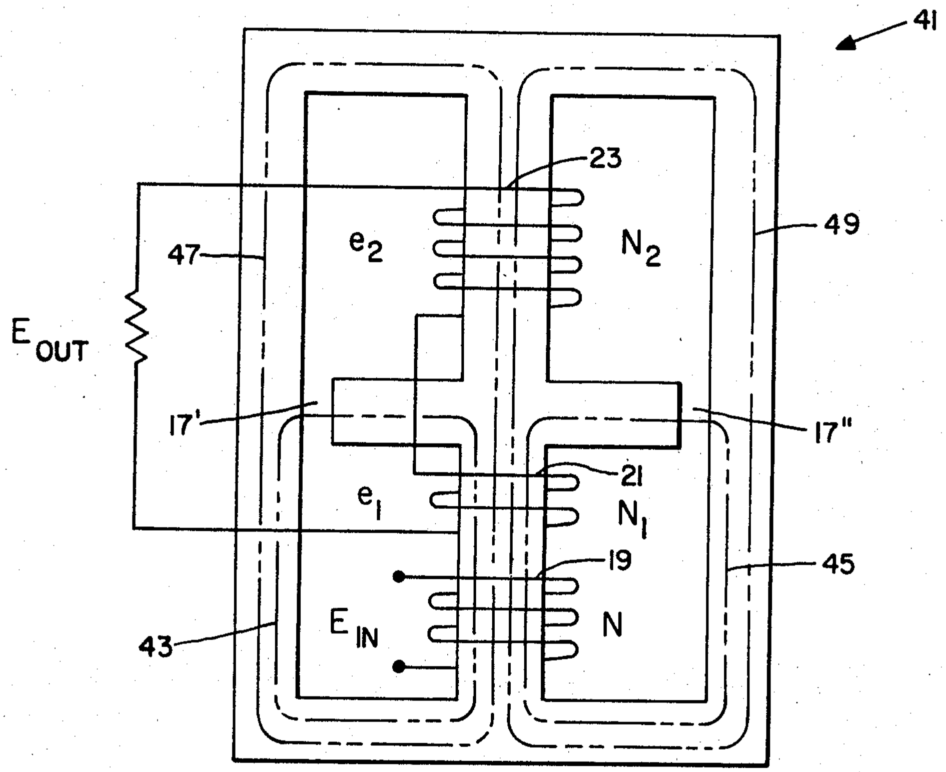

Other objects, advantages and novel features of the invention will become apparent from the following detailed description of the invention when considered in conjunction with the accompanying drawings wherein:

FIG. 1 is a schematic diagram of one embodiment of the present invention having two separate cores;

FIGS. 2*a* through 2*f* are curves illustrating the operation of the FIG. 1 embodiment;

FIG. 3 is a schematic diagram of another embodiment of the present invention having a single core; and FIG. 4 is a schematic diagram of still another embodiment of the present invention having a single core and two high impedance flux paths and two low impedance flux paths.

In FIG. 1 is illustrated one embodiment of the magnetic square wave generator 11 of the present invention. Square wave generator 11 includes magnetic core 13 and magnetic core 15. Magnetic core 13 is a continuous loop whereas magnetic core 15 is a continuous loop having an air gap 17. The input winding 19 is common to both of cores 13 and 15, has N turns and has an input voltage $E_{in}$ applied thereto. The input voltage $E_{in}$ is sinusoidal and is obtained from a sinusoidal source, not shown. Coupling magnetic core 13 is output winding 21, having $N_1$ turns, and coupling magnetic core 15 is output winding 23, having $N_2$ turns. Output windings 21 and 23 are connected in additive series with each other and are connected in series with load resistor 25. The output signal $E_{out}$ appears across windings 21 and 23 and load resistor 25, as shown.

One embodiment of the present invention which has been found to be quite successful in operation has the parameters set forth below. However, it is to be understood, and it will be obvious to those skilled in the art, that modifications of these parameters may be made provided these modifications are consistent with the disclosures and result in an operable device embodying the principles taught by this disclosure.

PARAMETERS OF MAGNETIC SQUARE GENERATOR 11

Cross sectional area of cores 13 and 15 — 1 square inch
Core material — standard silicon transformer grade iron

| | |
|---|---|
| Turns (N) of winding 19 | 120 |
| Turns ($N_1$) winding **21** | 80 |
| Turns ($N_2$) of winding **23** | 150 |
| Air Gap **17** | 0.1 inch |

OPERATION

Figures 2A, 2B, 2C, 2D:
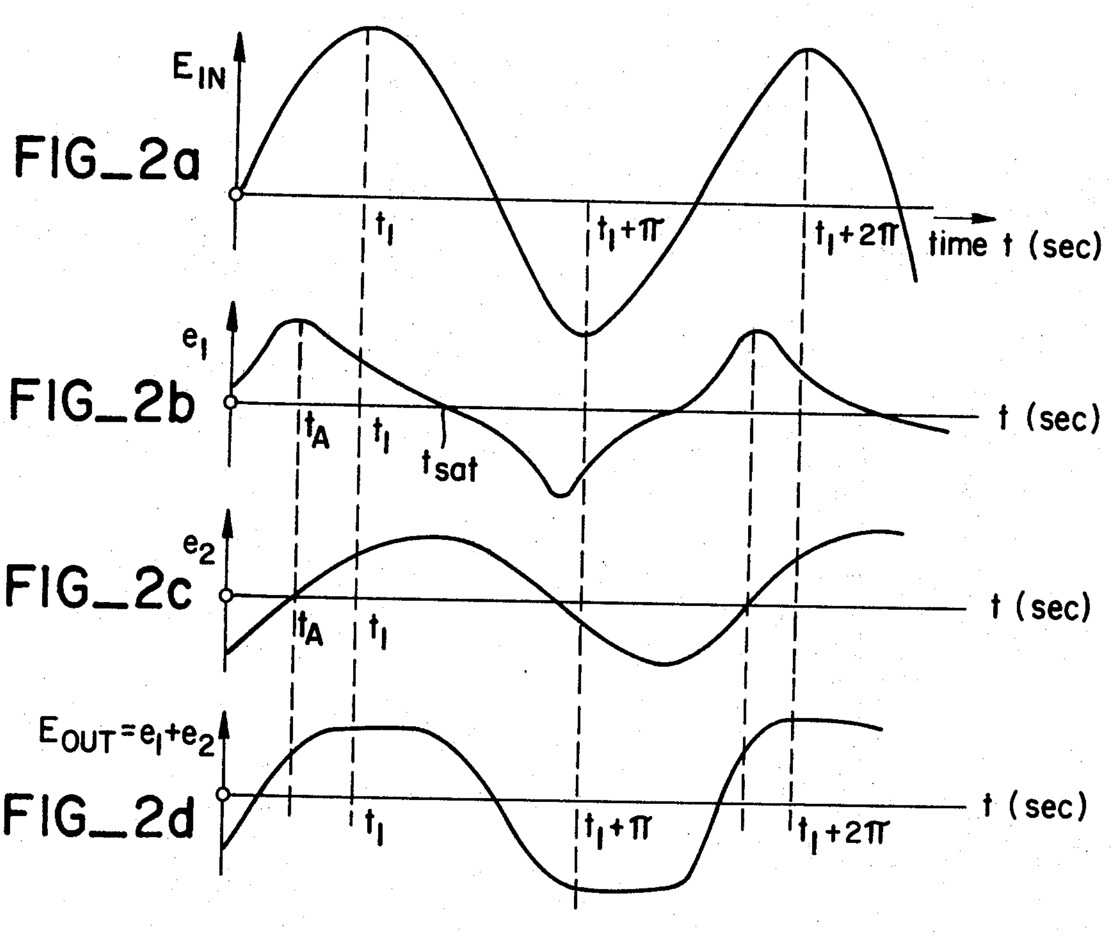
Figure 2F:
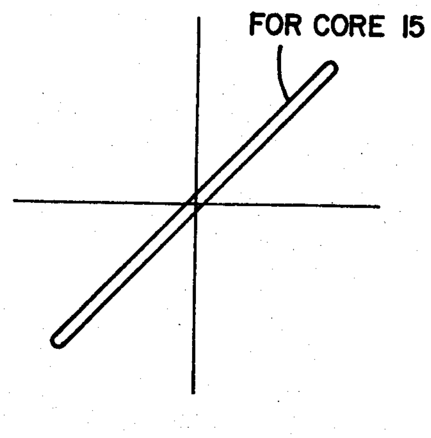
Figure 2E:
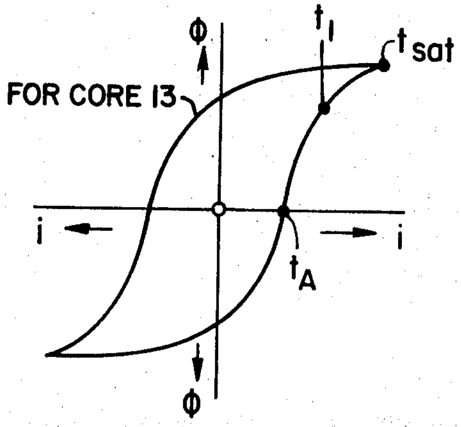

Referring to FIGS. 2*a* through 2*f*, FIG. 2*a* represents the input signal $E_{in}$, FIG. 2*b* represents the output signal $e_1$ of output winding 21, FIG. 2*c* represents the output signal $e_2$ of output winding 23, FIG. 2*d* represents the output signal $E_{out}$ which is the summation of the output signals $e_1$, and $e_2$ of FIGS. 2*b* and 2*c*. FIGS. 2*e* and 2*f* are hysteresis curves of windings 21 and 23, respectively. Because of the air gap 17 in core 15, the impedance of core 15 is less than the impedance of core 13, and therefore core 13 will actuate or peak out earlier in time than core 15. This is illustrated in FIGS. 2*b* and 2*c* where the output voltage $e_1$, of winding 21 is at a maximum value at time $t_A$ whereas the output voltage $e_2$ of winding 23 is still a zero at this same time $t_A$. Moreover, where the voltage $e_1$ returns to zero at $t_{SAT}$ (where core 13 becomes saturated) then voltage $e_2$ is at its maximum value. From the addition of voltage $e_1$ and voltage $e_2$ it can be seen from FIG. 2*d* that the resultant output voltage $e_{out}$ is a nearly square shaped voltage as desired.

The factors determining the relative shape and timing of the $e_1$ and $e_2$ voltage of FIGS. 2*b* and 2*e* are the various above listed core parameters taking especially into account the air gap and the relative number of turns. This is also shown in FIGS. 2*e* and 2*f* where FIG. 2*e* is a flux ($\phi$) versus current ($i$) hysteresis curve of core 13 and FIG. 2*f* is a flux ($\phi$) versus current ($i$) hysteresis curve of core 15. Since the voltage $$e = n\frac{\Delta\phi}{\Delta t}$$

the reason for the shape of the FIGS. 2*b* and 2*c* curves can be seen respectively from FIGS. 2*e* and 2*f*.

By choosing the output turns $N_1$ and $N_2$ and other magnetic parameters properly, a square voltage wave can be generated from a summation of many other wave forms different from the output voltages shown in FIGS. 2*b* and 2*c*. Negative saturation occurs at $t_1 + \pi$ seconds and the positive cycle repeats again at $t_1 + 2\pi$ seconds.

In FIG. 3 is still another embodiment of the present invention using a one piece magnetic square wave generator 29 rather than a two piece magnetic square wave generator as shown and described in the FIG. 1 embodiment. The FIG. 3 embodiment includes a one piece magnetic core 31. Although the center section 32 is one piece, it functions as two separate pieces as illustrated by center dividing line 33. In the FIG. 3 embodiment the core 35 is formed on the left of dividing line 33 and is equivalent to core 13 of FIG. 1 whereas core 37 is formed on the right of dotted line 33 and is equivalent to core 15 of FIG. 1. With these equivalent relationships in mind the operation of the FIG. 3 embodiment is the same as the FIG. 1 embodiment and will therefore not be described.

In FIG. 4 is illustrated still another embodiment of the present invention comprising a single piece magnetic square wave generator 41 having a pair of air gaps 17' and 17''. The low impedance air gap flux paths are shown by broken lines 43 and 45 respectively across air gaps 17' and 17''. The high impedance flux paths are indicated by broken lines 47 and 49. The input signal $E_{in}$ generates each of flux paths 43, 45, 47, and 49. From FIG. 4 it can be seen that each of flux paths 43, 45, 47, and 49 are coupled with winding 21 providing a voltage $e_1$, which is equivalent to the voltage $e_1$ of FIGS. 1 and 3. Also winding 21 of FIG. 4 is equivalent to winding 21 of the FIG. 1 and FIG. 3 embodiments. In addition, flux paths 47 and 49 coupled with winding 23 and produce an output voltage $e_2$. Winding 23 of FIG. 4 is equivalent to winding 23 of the FIGS. 1 and 3 embodiments. The primary advantage of the FIG. 4 embodiment is that it is a dual circuit and provides about twice the output of the FIG. 1 and FIG. 3 embodiments. The operation of the FIG. 4 circuit is similar to the operation of the FIG. 1 and FIG. 3 circuits and will therefore not be described.

What is claimed is:

1. A magnetic voltage generator comprising:

a. at least one core having a high impedance flux path and a low impedance flux path;

b. an input winding coupling said high impedance flux and said low impedance flux path;

c. a first output winding coupling said high impedance flux path;

d. a second output winding coupling said low impedance flux path;

e. said input winding has about 120 turns;

f. said first output winding has about 80 turns;

g. said second output winding has about 150 turns;

h. said high impedance flux path comprises a silicon transformer grade iron having a cross-sectional area of about 1 square inch;

i. said low impedance flux path comprises a silicon transformer grade iron material having a cross-sectional area of about 1 inch and an air gap of about 0.1 inch;

j. said first and second output windings connected in series; wherein k. a sinusoidal input signal applied to said input winding results in a substantially square wave output signal across said series connected first and second output windings.

2. The device of claim 1 wherein:

a. said high impedance flux path comprises a first separate core; and b. said low impedance flux path comprises a second separate core having said air gap.

3. The device of claim 1 wherein:

a. said high and low impedance flux paths are formed in a single core wherein;

b. said high impedance flux path is formed in a first continuous ring;

c. said low impedance flux path is formed in a second continuous ring having said air gap; and whereby d. a section of said first continuous ring and a section of said second continuous ring are physically interconnected.

* * * * *